M. B. GEORGE.
COOKING UTENSIL.
APPLICATION FILED NOV. 15, 1915.
1,276,749.
Patented Aug. 27, 1918.
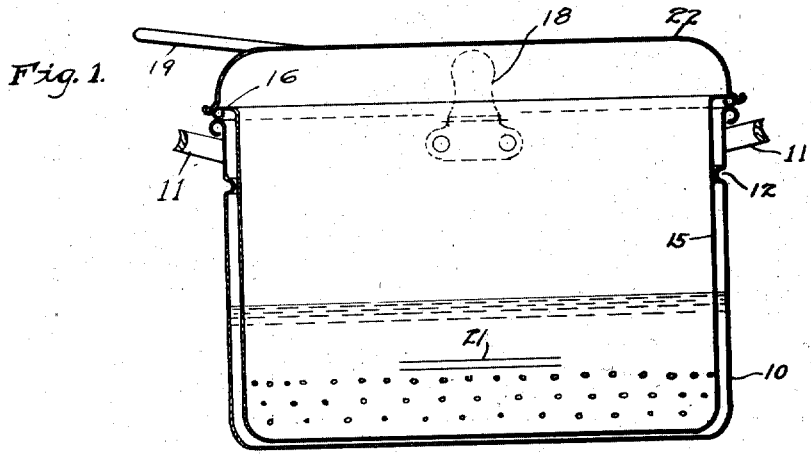
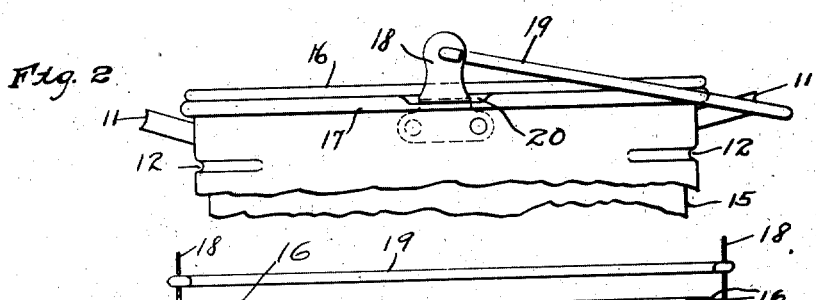
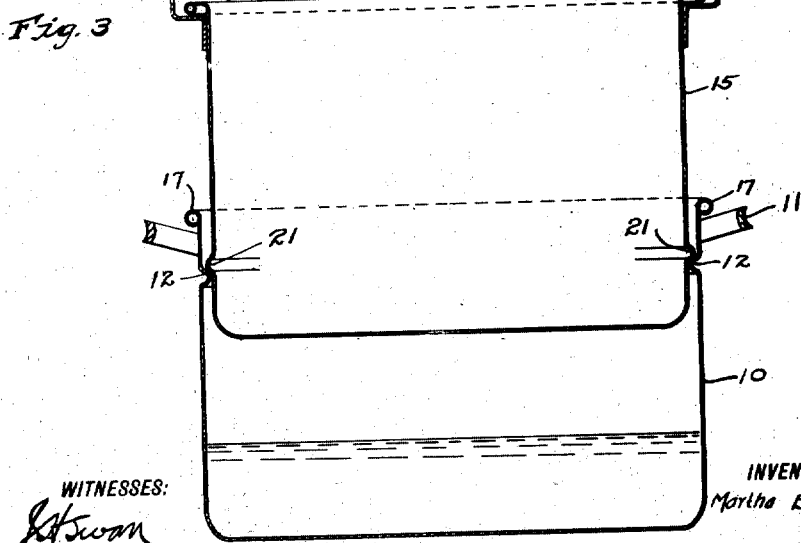
WITNESSES:
J. H. Swan
J. H. Wells
INVENTOR
Martha B. George
BY
Lockwood & Lockwood
ATTORNEYS
UNITED STATES PATENT OFFICE.

MARTHA B. GEORGE, OF INDIANAPOLIS, INDIANA.

COOKING UTENSIL.

1,276,749.

Specification of Letters Patent.

Patented Aug. 27, 1918.

Application filed November 15, 1915. Serial No. 61,572.

*To all whom it may concern:*

Be it known that I, MARTHA B. GEORGE, a citizen of the United States, and a resident of Indianapolis, county of Marion, and State of Indiana, have invented a certain new and useful Cooking Utensil; and I do hereby declare that the following is a full, clear, and exact description thereof, reference being had to the accompanying drawings, in which like letters refer to like parts.

This invention relates to a cooking utensil adapted for boiling potatoes or other food products and for draining and drying them after they have been boiled and the object of this invention is to provide a simple and convenient cooking utensil for accomplishing said purpose, one with only two parts and readily changeable from the boiling to the draining and drying position and with the colander or inner perforated vessel approximately as large as the outer vessel so that practically all of the water during the boiling will be in the colander and there will be no waste space between the two vessels, only enough to protect the colander from burning.

The chief feature of this invention consists in forming, preferably integral, with the colander and outer vessel transverse supporting ribs arranged so that when the colander is elevated and turned after elevation in proper position, the ribs on the outer vessel will support the ribs on the colander and thereby support the colander in its elevated or drying position.

The full nature of the invention will be understood from the accompanying drawings and the following description and claim.

In the drawings, Figure 1 is a central vertical section through the vessel in condition for boiling potatoes or the like. Fig. 2 is an elevation of the upper part of the vessel in boiling condition, with the lid removed from the colander. Fig. 3 is the same as Fig. 1 with the lid removed the colander being in its elevated position for drying the contents of the colander.

The outer vessel 10 is circular and adapted for boiling food products. On opposite sides are handles 11. Immediately under each handle there is a transverse inwardly projecting rib 12. These ribs are indented or stamped in the metal itself and each extends transversely for about thirty degrees.

The colander 15 is perforated at its lower end, both the bottom and the sides thereof, and is preferably almost as large as the outer vessel so that its side walls will almost engage with the ribs 12 in the outer vessel and its bottom will be supported immediately, say, one-eighth inch, above the bottom of the outer vessel so that the chamber between the two vessels will be reduced to the minimum, the chamber at the side being only sufficient to permit the introduction and removal of the colander and at the bottom only sufficient to keep the colander from burning, substantially as shown. This increases the relative capacity of the colander and practically all of the water is in the colander where it comes in contact with the food products and facilitates the boiling process thereof. The colander has a top rim 16 adapted to rest upon the rim 17 of the outer vessel so as to suspend or support the colander in said outer vessel and make a tight joint between them. The colander has ears 18 for a bail 19 and the rim 17 of the outer vessel has recesses 20 in the top thereof to receive the ears 18 so that the rims 16 and 17 may fit tightly together and make a tight joint between the vessels which is desired.

The colander has at two opposite points outwardly projecting ribs 21 a short distance above the bottom thereof. In the form shown these ribs are pressed or stamped in the metal of the colander and extend transversely about thirty degrees each. They are located under the ears 18.

The operation of the device is as follows:

The outer vessel is supplied with water and the potatoes or other food product placed within the colander and the lid 22 secured thereon. The colander is supported by the bail 19 as it is lowered into the outer vessel with ears or handle members of the colander substantially ninety degrees away from the handles of the outer vessel and above and in registry with the recesses 20 in the top of the outer vessel. Therefore, the ribs 21 will entirely miss the ribs 12 of the outer vessel as the colander is being lowered to its boiling position in the outer vessel. The rim 16 under the influence of the weight of the colander will fit tightly on the rim 17 of the outer vessel and tightly close the latter.

After the boiling is completed and it is desired to drain and dry the potatoes or other food product in the colander, the colander is lifted by the bail 19 almost out of the outer vessel, until at least the ribs 21 of the colander are higher than the ribs 12 of the outer vessel. Then the colander is turned ninety degrees, that is, until the handle members of the two vessels register with each other, one being above the other, and the colander is then lowered until its ribs 21 rest upon the ribs 12 of the outer vessel, as shown in Fig. 3. This supports the bottom of the colander above the water and still retains the heat as the colander still effectually closes the outer vessel, serving as a lid or closure therefor. This retention of the heat facilitates the drying of the potatoes or the like in the colander when in its elevated position.

Therefore, it is seen that this invention dispenses with all additional attachments to the inner and outer vessels for supporting the inner vessel in either the lower or the upper position. The supporting means are rigidly secured to or integral with the vessels, as shown herein. This not only enables the colander to be as large approximately as the outer vessel, but practically requires it to be almost as large in order that ribs of the colander may be supported upon the ribs of the outer vessel. The manipulation of the device is easy because the ears or handle members of the colander register with the recesses in the top of the outer vessel and with the ribs on the colander and thus serve as a guide in lowering the colander into boiling position. When the colander is elevated preliminary to moving it to the drying position, it is turned until the handle members of the two vessels register with each other. That makes it certain that the ribs will be in their proper relative positions for supporting the colander in the outer vessel. By making the ribs about thirty degrees long, there will be ample space between the ribs on the two vessels when the colander is being lowered to the boiling position so that there will be no danger of them interfering during such movement.

The invention claimed is:

A cooking utensil including an outer vessel with an outwardly turned top rim and a pair of oppositely located inwardly extending transverse segmental ribs in the upper part thereof, and a colander adapted to fit in said outer vessel and having a pair of oppositely located outwardly extending transverse segmental ribs in the lower part thereof and adapted when the colander is in elevated position to engage and rest upon the ribs in the wall of the outer vessel and also having a top rim projecting outwardly far enough to rest upon the top rim of the outer vessel when the colander is lowered therein for supporting the colander in said outer vessel.

In witness whereof I have hereunto affixed my signature.

MARTHA B. GEORGE.